US009678239B2

(12) United States Patent
Habashy et al.

(10) Patent No.: US 9,678,239 B2
(45) Date of Patent: *Jun. 13, 2017

(54) SYSTEM AND METHOD FOR IMAGING PROPERTIES OF SUBTERRANEAN FORMATIONS

(71) Applicant: Schlumberger Technology Corporation, Sugar Land, TX (US)

(72) Inventors: Tarek M. Habashy, Burlington, MA (US); Andrew J. Hayman, Voisins-le-Bretonne (FR); Yong-Hua Chen, Belmont, MA (US); Dzevat Omeragic, Lexington, MA (US); Philip S Cheung, Wadhurst (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/272,431

(22) Filed: May 7, 2014

(65) Prior Publication Data
US 2014/0239960 A1    Aug. 28, 2014

Related U.S. Application Data

(63) Continuation of application No. 12/945,928, filed on Nov. 15, 2010, now Pat. No. 8,754,651.

(51) Int. Cl.
*G01V 3/00* (2006.01)
*G01V 3/20* (2006.01)
(Continued)

(52) U.S. Cl.
CPC ............. *G01V 3/20* (2013.01); *E21B 49/005* (2013.01); *G01V 3/24* (2013.01); *G01V 3/088* (2013.01)

(58) Field of Classification Search
CPC .... G01R 27/02; G01R 15/24; G01N 21/6408; G01N 27/403; G01V 1/30; G01V 3/10; H01L 29/122
(Continued)

(56) References Cited

U.S. PATENT DOCUMENTS 3,816,811 A    6/1974 Cmelik
3,879,644 A    4/1975 Maltby
(Continued)

FOREIGN PATENT DOCUMENTS

EP    2182392 B1    5/2010
EP    2182394 A1    5/2010
(Continued)

OTHER PUBLICATIONS

T.M. Habashy and A. Abubaker, "A General Framework for Constraint Minimization for the inversion of Electromagnetic Measurements," Progress in Electromagnetic Research, Pier 46, 265-312, 2014.
(Continued)

*Primary Examiner* — Melissa Koval
*Assistant Examiner* — Trung Nguyen
(74) *Attorney, Agent, or Firm* — Michael Dae

(57) ABSTRACT

A system and method for imaging properties of subterranean formations in a wellbore is provided. The system comprises a formation sensor for collecting currents injected into the subterranean formations, the formation sensor positionable on a downhole tool deployable into the wellbore. The system comprises a controller for controlling the formation sensor and a formation imaging unit. The formation imaging unit comprises a current management unit for collecting data from the currents injected into the subterranean formations, the currents having at least two different frequencies. The formation imaging unit comprises a drilling mud data unit
(Continued)

for determining at least one drilling mud parameter, a formation data unit for determining at least one formation parameter from the collected data, and an inversion unit for determining at least one formation property by inverting the at least one formation parameter.

20 Claims, 14 Drawing Sheets

(51) Int. Cl.
  *G01V 3/24* (2006.01)
  *E21B 49/00* (2006.01)
  *G01V 3/08* (2006.01)
(58) Field of Classification Search
  USPC ............ 324/323–364, 200, 207.13, 219; 376/1–86; 343/703, 709, 718–719
  See application file for complete search history.

(56) References Cited

U.S. PATENT DOCUMENTS

| | | | |
|---|---|---|---|
| 4,567,759 A | 2/1986 | Ekstrom et al. | |
| 4,608,983 A | 9/1986 | Muller et al. | |
| 5,345,179 A | 9/1994 | Habashy et al. | |
| 5,457,396 A | 10/1995 | Mori et al. | |
| 5,574,371 A | 11/1996 | Tabanou et al. | |
| 5,677,631 A | 10/1997 | Reittinger et al. | |
| 6,191,588 B1 | 2/2001 | Chen | |
| 6,527,923 B2 | 3/2003 | Kirk et al. | |
| 6,801,039 B2 | 10/2004 | Fabris et al. | |
| 7,066,282 B2 | 6/2006 | Chen et al. | |
| 7,258,005 B2 | 8/2007 | Nyce | |
| 7,394,258 B2 | 7/2008 | Itskovich et al. | |
| 7,397,250 B2 | 7/2008 | Bespalov et al. | |
| 7,689,363 B2 | 3/2010 | Itskovich et al. | |
| 2008/0288171 A1 | 11/2008 | Itskovich et al. | |
| 2009/0072833 A1 | 3/2009 | Tabarovsky | |
| 2009/0090176 A1 | 4/2009 | Toribio et al. | |
| 2009/0153155 A1 | 6/2009 | Chambon et al. | |
| 2009/0204346 A1 | 8/2009 | Xie | |
| 2009/0306896 A1 | 12/2009 | Forgang et al. | |
| 2010/0019772 A1 | 1/2010 | Gorek | |
| 2010/0149917 A1 | 6/2010 | Imhof et al. | |
| 2011/0199089 A1 | 8/2011 | Hayman | |
| 2012/0119744 A1 | 5/2012 | Habashy et al. | |
| 2013/0176030 A1* | 7/2013 | Simon | G01V 3/30 324/333 |
| 2014/0368201 A1* | 12/2014 | Leblanc | G01V 3/26 324/339 |

FOREIGN PATENT DOCUMENTS

| | | |
|---|---|---|
| EP | 2362210 B1 | 8/2011 |
| EP | 2385366 A1 | 9/2011 |
| GB | 2306667 A | 5/1997 |
| WO | 2009126150 A1 | 10/2009 |
| WO | 2010049105 A1 | 5/2010 |

OTHER PUBLICATIONS

Ekstrom, M. P., Dahan, C. A., Chen, M. Y., Lloyd, P. M., and Rossi, D. J., "Formation imaging with microelectrical scanning arrays." The Log Analyst, vol. 28, No. 3, 1987, pp. 294-306.
Communication Article 94(3) issued in the related EP Application 11788681.2, dated Feb. 19, 2014 (4 pages).
Office action issued in the Related MX application MX/a/2013/005401, dated Feb. 26, 2014 (14 pages).
International search report and the written opinion issued in the related PCT application PCT/US2011/059874, dated Jan. 2, 2013 (10 pages).
International preliminary Report on patentability issued in the related PCT application PCT/US2011/059874, dated May 21, 2013 (6 pages).
International search report and the written opinion issued in the related PCT application PCT/US2011/055077, dated Aug. 31, 2012 (10 pages).
International preliminary Report on patentability issued in the related PCT application PCT/US2011/055077, dated May 21, 2013 (6 pages).

* cited by examiner

SYSTEM AND METHOD FOR IMAGING PROPERTIES OF SUBTERRANEAN FORMATIONS

RELATED APPLICATIONS

This application is a continuation of U.S. patent application Ser. No. 12/945,928, filed on Nov. 15, 2010, published as U.S. Publication No. 2012/0119744 on May 17, 2011.

TECHNICAL FIELD

The present invention relates to techniques for performing wellbore operations. More particularly, the present invention relates to techniques for determining characteristics of subterranean formations.

BACKGROUND

Oil rigs are positioned at wellsites for performing a variety of oilfield operations, such as drilling a wellbore, performing downhole testing and producing located hydrocarbons. Downhole drilling tools are advanced into the earth from a surface rig to form a wellbore. Drilling muds are often pumped into the wellbore as the drilling tool advances into the earth. The drilling muds may be used, for example, to remove cuttings, to cool a drill bit at the end of the drilling tool and/or to provide a protective lining along a wall of the wellbore. During or after drilling, casing is typically cemented into place to line at least a portion of the wellbore. Once the wellbore is formed, production tools may be positioned about the wellbore to draw fluids to the surface.

During drilling, measurements are often taken to determine downhole conditions. In some cases, the drilling tool may be removed so that a wireline testing tool may be lowered into the wellbore to take additional measurements and/or to sample downhole fluids. Once the drilling operation is complete, production equipment may be lowered into the wellbore to assist in drawing the hydrocarbons from a subsurface reservoir to the surface.

The downhole measurements taken by the drilling, testing, production and/or other wellsite tools may be used to determine downhole conditions and/or to assist in locating subsurface reservoirs containing valuable hydrocarbons. Such wellsite tools may be used to measure downhole parameters, such as temperature, pressure, viscosity, resistivity, etc. Such measurements may be useful in directing the oilfield operations and/or for analyzing downhole conditions.

Attempts have been made to measure certain characteristics of a wellbore. Various techniques have been developed for measuring downhole parameters as described, for example, in US patent/application Nos. 20090204346, 20090153155, 20090072833, 20090090176, 20080288171, U.S. Pat. Nos. 7,689,363, 7,394,258, 7,397,250, 7,258,005, 5,457,396, 6,527,923, 7,066,282, 6,801,039, 5,677,631, 5,574,371, 5,345,179, 6,191,588, 3,879,644, 3,816,811, 4,608,983, 4,567,759, and 7,689,363. Techniques have also been developed for scanning as stated in publications "Formation Imaging with Microelectrical Scanning Arrays", and "A General Framework for Constraint Minimization for the Inversion of Electromagnetic Measurements."

More specifically, European Patent Application Nos. 102900084.2 and 10290083.4, filed by Applicant and incorporated herein by reference, relate to techniques for determining electrical parameters of downhole fluids.

In addition, International Patent Application No. PCT/EP2009/007637, filed by Applicant and incorporated herein by reference, relates to a tool and method for imaging a formation through a substantially non-conductive medium. The tool comprises a first circuitry for injecting a current into the formation, wherein a complex impedance of the current is measured. A second circuitry for determining a phase angle of an impedance of the nonconductive medium and a third circuitry for determining a component of the complex impedance that is orthogonal to the phase angle.

Despite the development of techniques for measuring downhole parameters, there remains a need to provide advanced techniques for determining parameters of downhole formations and/or wellbore fluids. It may be desirable to provide techniques that enhance downhole fluid and/or downhole formation measurements. It may be further desirable to provide techniques that correct for the effects of mud on downhole imaging and/or measurement. Preferably, such techniques involve one or more of the following, among others: accuracy of measurements, optimized measurement processes, operability in a variety of downhole fluids such as conductive and non-conductive muds, flexible measurement and/or analysis, operability in downhole conditions (e.g., at high temperatures and/or pressures), etc.

SUMMARY

The present invention relates to a formation imaging unit for imaging properties of at least one subterranean formation in a wellbore at a wellsite. The formation imaging unit comprises a current management unit for collecting data from at least two currents injected into the at least one subterranean formation, the at least two currents having at least two different frequencies, and a drilling mud data unit for determining at least one drilling mud parameter. The formation imaging unit comprises a formation data unit for determining at least one formation parameter from the collected data, and an inversion unit for determining at least one formation property by inverting the at least one formation parameter.

The present invention relates to a system for imaging properties of at least one subterranean formation in a wellbore at a wellsite. The system comprises a formation sensor for collecting at least two currents injected into the at least one subterranean formation, the formation sensor positionable on a downhole tool deployable into the wellbore, a controller for controlling the formation sensor, and a formation imaging unit. The formation imaging unit comprises a current management unit for collecting data from the at least two currents injected into the at least one subterranean formation, the at least two currents having at least two different frequencies. The formation imaging unit comprises a drilling mud data unit for determining at least one drilling mud parameter, a formation data unit for determining at least one formation parameter from the collected data, and an inversion unit for determining at least one formation property by inverting the at least one formation parameter.

The present invention relates to a method for imaging properties of at least one subterranean formation in a wellbore at a wellsite. The method comprises deploying a downhole tool into the wellbore, the downhole tool having a formation sensor thereon and collecting at least two currents sent through the at least one subterranean formation from the formation sensor. The method comprises sending formation data from the at least two currents to a formation imaging unit. The formation imaging unit comprises a current management unit for collecting data from the at least two currents injected into the at least one subterranean formation, the at least two currents having at least two different frequencies, a drilling mud data unit for determining at least one drilling mud parameter, a formation data unit for determining at least one formation parameter from the collected data, and an inversion unit for determining at least one formation property by inverting the at least one formation parameter. The method comprises determining at least one formation property with the formation imaging unit.

BRIEF DESCRIPTION OF THE DRAWINGS

The present embodiments may be better understood, and numerous objects, features, and advantages made apparent to those skilled in the art by referencing the accompanying drawings. These drawings are used to illustrate only typical embodiments of this invention, and are not to be considered limiting of its scope, as the invention may admit to other equally effective embodiments. The figures are not necessarily to scale and certain features and certain views of the figures may be shown exaggerated in scale or in schematic in the interest of clarity and conciseness.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details. Presently preferred embodiments of the invention are shown in the above-identified Figures and described in detail below.

Figure 1:
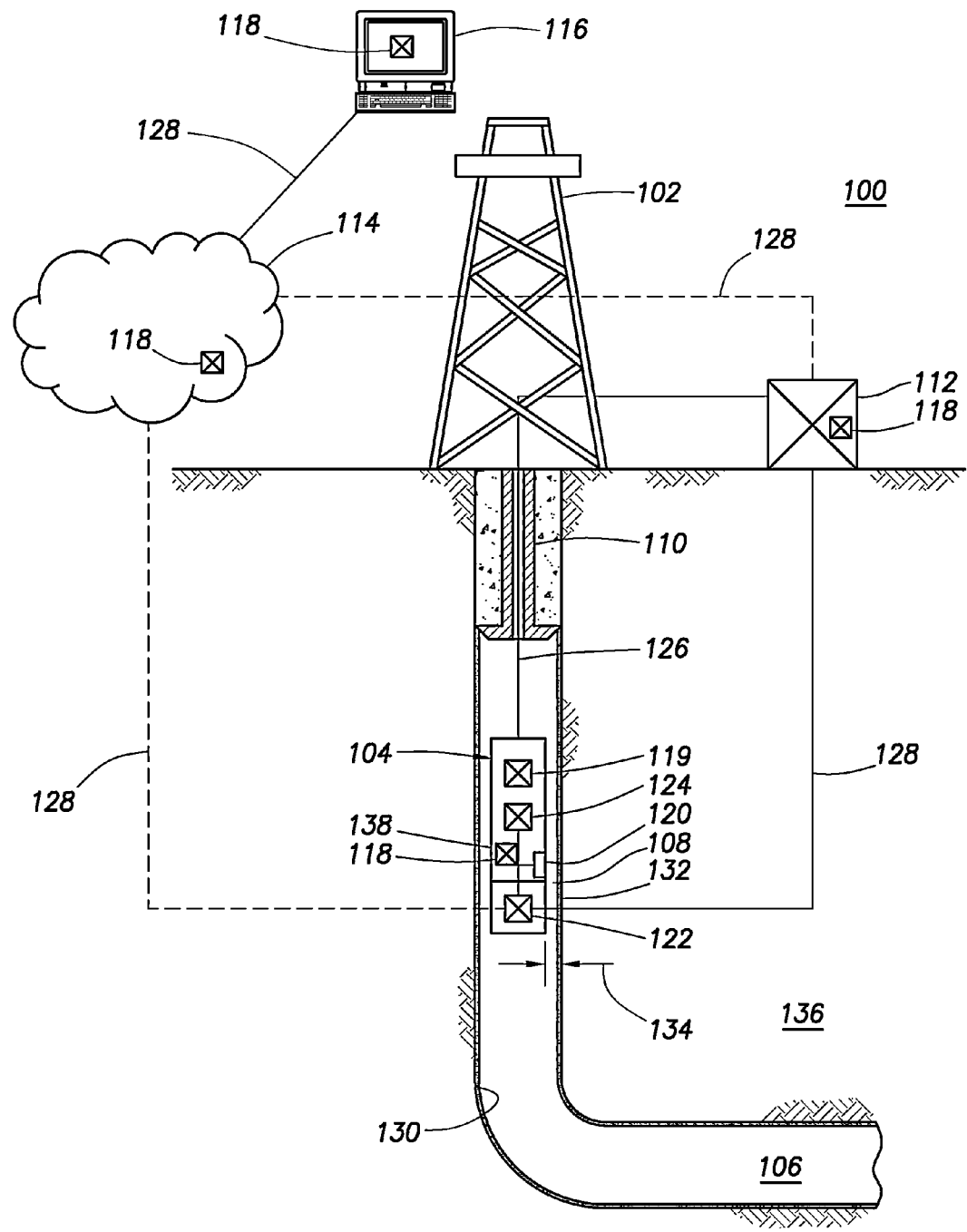
FIG. 1 is a schematic view of a system for imaging properties of one or more subterranean formations having a downhole tool deployable into a wellbore.

FIG. 1 is a schematic view of a wellsite 100 having an oil rig 102 with a downhole tool 104 suspended into a wellbore 106 therebelow. The wellbore 106 has been drilled by a drilling tool (not shown). A drilling mud, and/or a wellbore fluid 108, may have been pumped into the wellbore 106 and may line a wall thereof. As shown, a casing 110 has also been positioned in the wellbore 106 and cemented into place therein. The downhole tool 104 may have one or more sensors for determining one or more downhole parameters, such as wellbore fluid parameters and/or formation parameters. The downhole tool 104 may communicate with a controller 112, a communication network 114 and/or one or more offsite computers 116. The downhole tool 104, the controller 112, the communication network 114 and/or the offsite computers 116 may have a formation imaging unit 118. The fluid parameters and/or the formation parameters sensed by the downhole tool 104 may be sent to the formation imaging unit 118 to determine formation properties and/or to optimize a well plan at the wellsite 100. The term "imaging" as used herein, is a common term in the geophysics and oilfield art to refer to a representation that depicts an array of localized properties of a wellbore in two or more dimensions.

The downhole tool 104 is shown as a wireline logging tool lowered into the wellbore 106 to take various measurements. The downhole tool 104 may include a conventional logging device 119, one or more sensor pads 120, one or more telemetry devices 122, and an electronics package 124. The conventional logging device 119 may be provided with various sensors, measurement devices, communication devices, sampling devices and/or other devices for performing wellbore operations. For example, as the downhole tool 104 is lowered, it may use devices, such as resistivity or other logging devices, to measure formation parameters and/or downhole fluid parameters. The formation parameters and/or the downhole fluid parameters may be the collected data regarding the formation and/or the downhole fluid. The formation imaging unit 118 may manipulate the formation parameters and optionally the downhole fluid parameters to determine formation properties and/or downhole fluid properties for example resistivity.

As shown, the downhole tool 104 may be conveyed into the wellbore 106 on a wireline 126. Although the downhole tool 104 is shown as being conveyed into the wellbore 106 on a wireline 126, it should be appreciated that any suitable conveyance may be used, such as a slick line, a coiled tubing, a drill string, a casing string and the like. The downhole tool 104 may be operatively connected to the controller 112 for communication therebetween. The downhole tool 104 may be wired via the wireline 126, as shown, and/or wirelessly linked via the one or more telemetry devices 122. The one or more telemetry devices 122 may include any telemetry devices, such as electromagnetic devices, for passing signals to the controller 112 as indicated by communication links 128. Further, it should be appreciated that any communication device or system may be used to communicate between the downhole tool 104 and the controller 112. Signals may be passed between the downhole tool 104, the controller 112, the communication network 114, and/or the offsite computer(s) 116 and/or other locations for communication therebetween.

While the downhole tool 104 is depicted as the wireline tool having the one or more sensor pads 120 thereon, it will be appreciated that the one or more sensor pads 120 may be positioned downhole on a variety of one or more tools. For example, the one or more sensor pads 120 may be placed on any downhole system and/or tool for example, on a drilling string, a logging while drilling tool (LWD), a measurement while drilling tool (MWD), a coiled tubing, a drill stem tester, a production tubing, a casing, a pipe, or any other suitable downhole tool. Although only one of the one or more sensor pads 120 is shown, it should be appreciated that one or more sensor pads 120 and/or portions of the one or more sensor pads 120 may be located at several locations in the wellbore 106. The one or more sensor pads 120 are preferably positioned about an outer surface of the downhole tool 104 so that the wellbore fluid 108 may pass therealong for measurement thereof. However, it will be appreciated that the one or more sensor pads 120 may be positioned at various locations about the wellsite 100 as desired for performing fluid and/or formation measurements.

The electronics package 124 may include any components and/or devices suitable for operating, monitoring, powering, calculating, calibrating, and analyzing components of the downhole tool 104. Thus, the electronics package 124 may include a power source, a processor, a storage device, a signal conversion (digitizer, mixer, amplifier, etc.), a signal switching device (switch, multiplexer, etc.), a receiver device and/or a transmission device, and the like. The electronics package 124 may be operatively coupled to the one or more sensor pads 120 and/or the formation imaging unit 118. The power source may be supplied by the wireline 126. Further, the power source may be in the electronics package 124. The power source may apply multiple currents to the one or more sensor pads 120. The power source may be provided by a battery power supply or other conventional means of providing power. In some cases, the power source may be an existing power source used in the downhole tool 104. The power source may be positioned, for example, in the downhole tool 104 and wired to the one or more sensor pads 120 for providing power thereto as shown. Optionally, the power source may be provided for use with the one or more sensor pads 120 and/or other downhole devices. Although the electronics package 124 is shown as one separate unit from the one or more sensor pads 120 and/or the formation imaging unit 118, it should be appreciated that any portion of the electronics package 124 may be included within the one or more sensor pads 120 and/or the formation imaging unit 118. Further, the components of the electronics package 124 may be located at various locations about the downhole tool 104, the controller 112 and/or the wellsite 100. The one or more sensor pads 120 may also be wired or wirelessly connected to any of the features of the downhole tool 104, the formation imaging unit 118, the communication network 114, and/or the controller 112, such as communication links, processors, power sources or other features thereof.

The downhole fluid 108, or wellbore fluid, or borehole mud fluid, used at the wellsite 100 may be an oil-based drilling mud. The downhole fluid 108 may be pumped into the wellbore 106 during drilling and/or other downhole operations. The downhole fluid 108 may coat a wellbore wall 130 as it encounters the wellbore wall 130. The downhole fluid 108 coated on the wellbore wall 130 may form a mud cake 132, or mud standoff. The mud cake 132 may create a gap 134, or standoff, or mud standoff, or sensor standoff, between the one or more sensor pads 120 and a subterranean formation 136. Further roughness of the wellbore wall 130 may cause the gap 134, or standoff, or sensor standoff, between the one or more sensor pads 120 and the subterranean formation 136. The oil-based drilling mud may have a high resistivity. For example, the resistivity of a water-based drilling mud may be between 0.01-20 Ohm and the resistivity for the oil-based drilling mud may be 10,000 to 10,000,000 times higher than the water-based drilling mud. Due to the high resistivity of the oil-based drilling mud, the properties of the oil-based drilling mud must be accounted for when determining formation properties, as will be discussed in more detail below. Because the same downhole fluid 108, or drilling mud, is typically used during wellsite operation, the properties of the downhole fluid 108 may remain relatively constant along the length of the wellbore 106.

The one or more sensor pads 120 may be capable of determining one or more downhole fluid parameters and/or one or more formation parameters. The one or more sensor pads 120 may determine the downhole parameters of the downhole fluids 108 and/or the subterranean formations 136 as the downhole tool 104 passes through the wellbore 106. As shown, the one or more sensor pads 120 may be positioned on an outer surface 138 of the downhole tool 104. A portion of the one or more sensor pads 120 may be recessed a distance below the outer surface 138 to provide additional protection thereto, or protruded a distance therefrom to access fluid and/or subterranean formation 136. The one or more sensor pads 120 may also be positioned at various angles and locations as desired.

Figure 2:
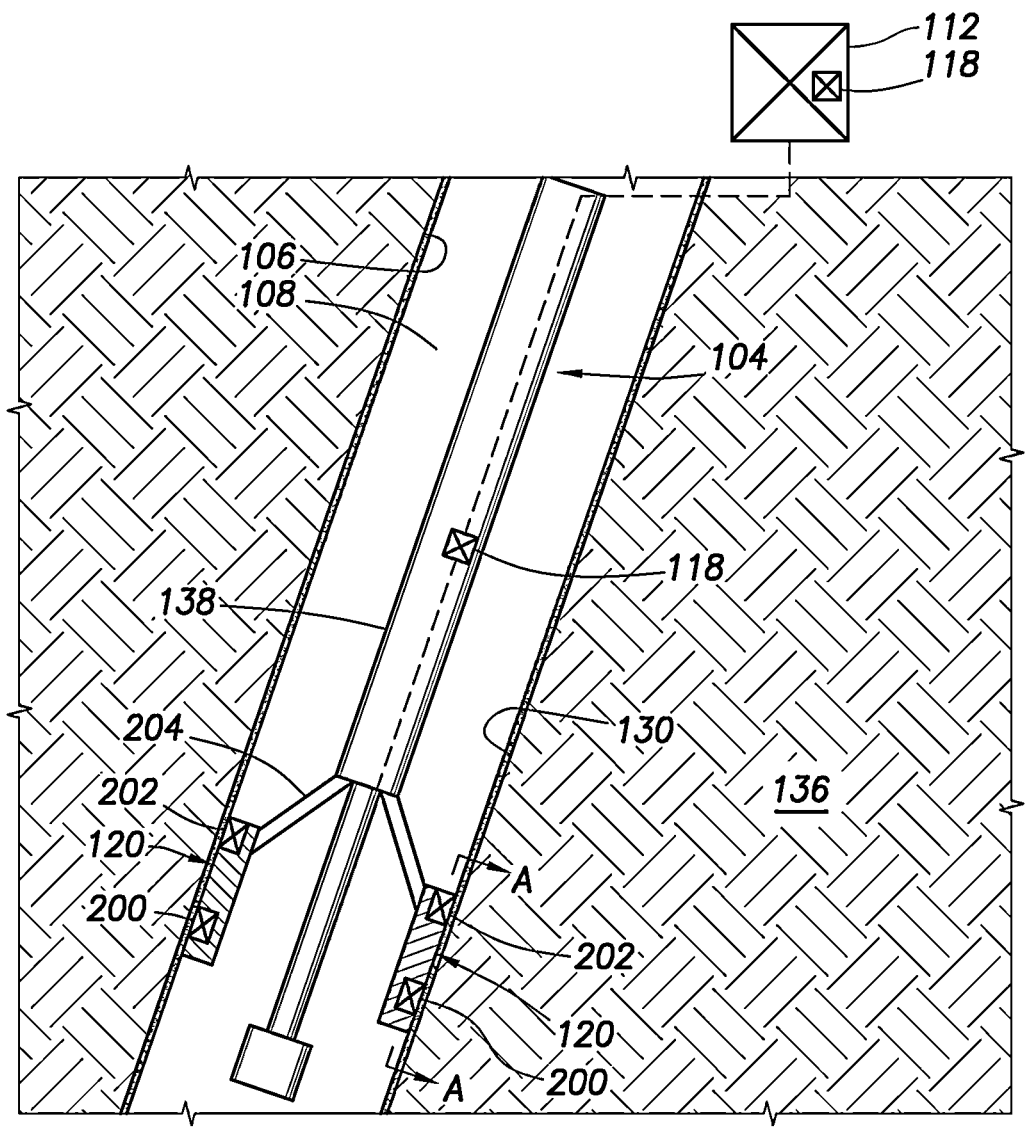
FIG. 2 is a schematic view of the downhole tool of FIG. 1 depicting the downhole tool with a sensor pad having a formation sensor thereon.

FIG. 2 shows a schematic view of the downhole tool 104 located in the wellbore 106 and within the subterranean formation 136. As depicted, the downhole tool 104 is a wireline microresistivity tool containing the one or more sensor pads 120 with a formation sensor 200 and optionally a mud sensor 202. The one or more sensor pads 120 may be located on the outer surface 138, or located on one or more arms 204 which extend from downhole tool 104. The one or more arms 204 may be configured to place the one or more sensor pads 120 as close to the wellbore wall 130, or against the mud cake 132 on the wellbore wall 130, as possible. The one or more arms 204 may be actuatable, or spring loaded in order to locate the one or more sensor pads 120 against the wellbore wall 130.

The formation sensor 200 may be any sensor configured to determine one or more formation parameters. The formation sensor 200 may send, or inject, a plurality of currents through a portion of the subterranean formation 136 between two electrodes. The plurality of currents may have two or more frequencies, as will be discussed in more detail below. The plurality of currents may pass through the downhole fluid 108 and the subterranean formation 136. The injected current may include information regarding formation and/or fluid parameters. The current detected by the formation sensor 200 may be sent to the formation imaging unit 118. The formation and/or fluid parameters may be manipulated by the formation imaging unit 118 to determine one or more formation properties, as will be discussed in more detail below. When the downhole fluid 108 is the oil-based drilling mud, the impedance contribution from the mud cake 132 may be significantly larger than the impedance contribution from the formation 136.

The mud sensor 202 may be an optional sensor configured to determine one or more downhole fluid parameters. The mud sensor 202 may be configured to send, or inject, current through the downhole fluid 108 and/or the mud cake 132. The current injected and detected by the mud sensor 202 may have the same frequencies as the plurality of currents injected by the formation sensor 200. The current detected by the mud sensor 202 may be sent to the formation imaging unit 118.

Figure 3:
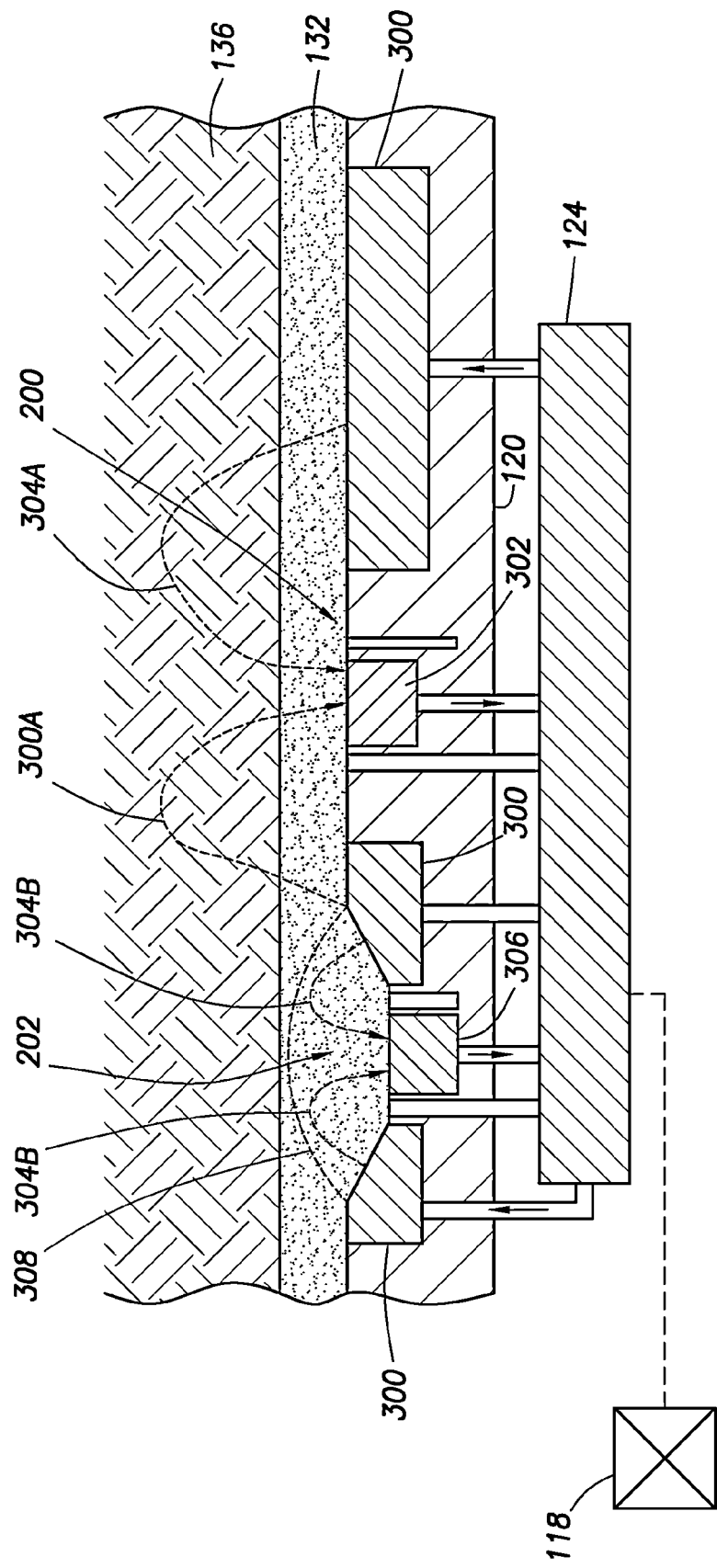
FIG. 3 is a longitudinal cross-sectional view of the sensor pad of FIG. 2 taken along line A-A depicting the formation sensor on a face of the sensor pad.

FIG. 3 depicts a cross sectional view of the sensor pad 120 of FIG. 2 having the formation sensor 200 and the mud sensor 202. As shown, the formation sensor 200 may have one or more source electrodes 300 and one or more return electrode 302 connected to the electronics package 124. The electronics package 124 may send a plurality of currents 304A to the source electrode 300. The plurality of currents 304A may travel through the mud cake 132, through the subterranean formation 136 and into the return electrode 302. The return electrode 302 may send the collected plurality of currents 304A to the electronics package 124 and/or the formation imaging unit 118.

The sensor pad 120 may optionally have the mud sensor 202. The mud sensor 202 may be configured to send a plurality of currents 304B through the mud cake 132 and/or the downhole fluid 108 (as shown in FIG. 1). By sending the plurality of currents 304B through the mud cake 132 and/or downhole fluid 108 only, the downhole fluid parameters may be determined. The mud sensor 202 may have the one or more source electrodes 300 and a mud return electrode 306. The electronics package 124 may send the plurality of currents 304B to the mud sensor 202, and source electrodes 300. The mud sensor 202, as shown, has a recessed configuration. The recessed configuration may be configured to pass the plurality of currents 304B through a fluid zone 308. The mud return electrode 306 may send the collected plurality of currents 304B to the electronics package 124 and/or the formation imaging unit 118.

Figure 4:
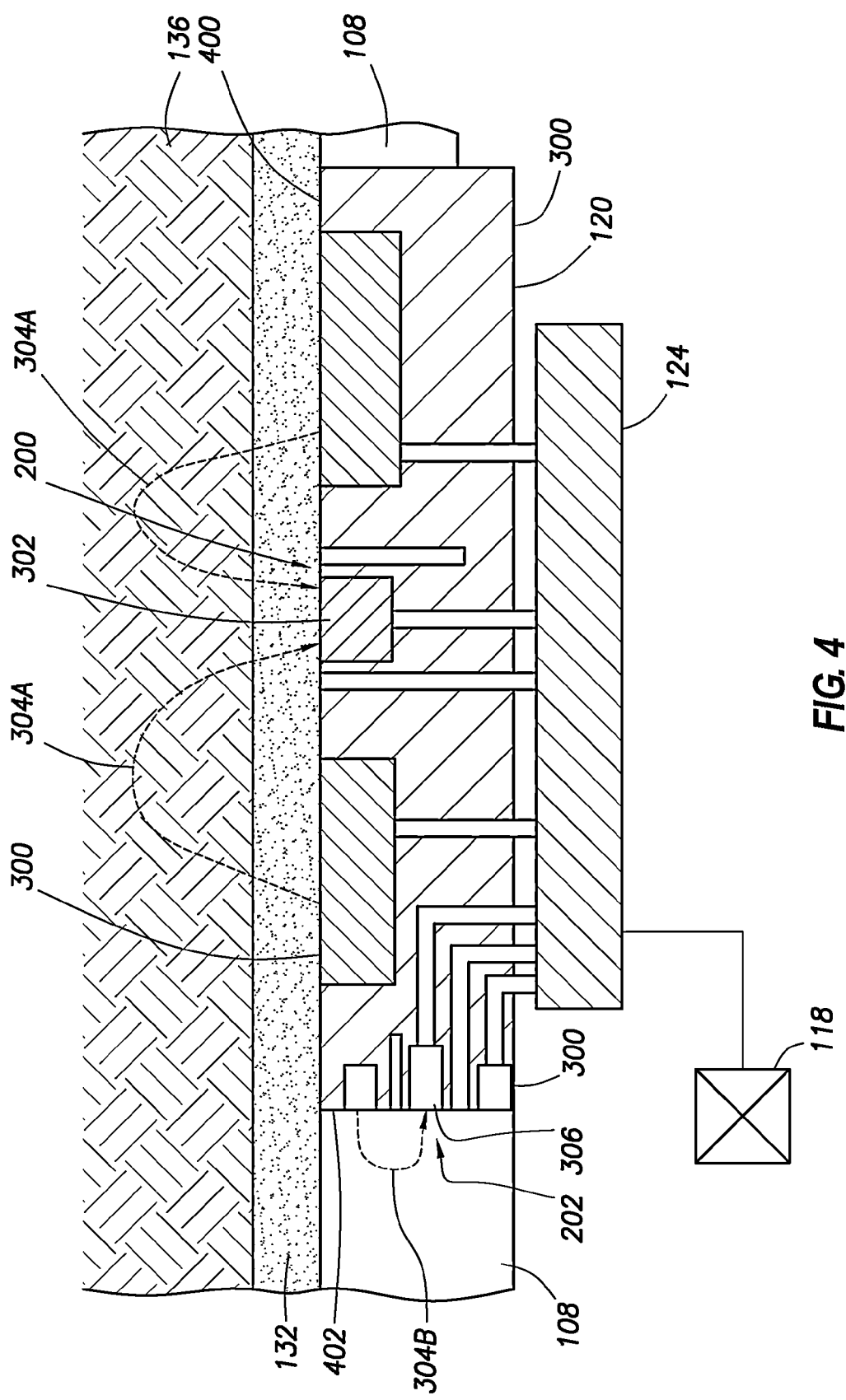
FIG. 4 is a longitudinal cross-sectional view of an alternate sensor pad of FIG. 3.

FIG. 4 depicts a cross sectional view of an alternated sensor pad 120 of FIG. 2 having the formation sensor 200 and the mud sensor 202. The formation sensor 200, as shown, may be located proximate a face 400 of the pad in a similar manner as shown in FIG. 3. The mud sensor 202; however, may be located on a side surface 402 of the sensor pad 120. Locating the mud sensor 202 on the side surface 402 may allow the plurality of currents 304B sent from the source electrodes 300 to the mud return electrode 306 to pass only through the downhole fluid 108. In a similar manner, as described herein, the return electrode 302 and the mud return electrode 306 may send the collected plurality of currents 304A and/or 304B to the electronics package 124 and/or the formation imaging unit 118. Although the mud sensor 202 is shown as being a recessed sensor, or a sensor on the side surface 402 of the sensor pad 120, it should be appreciated that the mud sensor 202 may be any suitable sensor for determining the downhole fluid parameters. The mud sensor 202 may also pass the plurality of current 304B through the formation 136. Further, the formation sensor 200 may be any suitable sensor for determining formation and/or downhole fluid parameters.

The plurality of currents 304A and/or 304B may be high frequency current in order to penetrate the highly resistive oil-based drilling mud. Due to the high frequency of the plurality of currents 304A and/or 304B, the source electrodes 300 and the return electrode 302 and/or the mud return electrode 306 may be located in close proximity to one another, as shown in FIGS. 3 and 4. The frequency range of the formation sensor 200 and/or the mud sensor 202 may be optimized in a frequency range from a few hundred KHz up to roughly 100 Mhz. Due to the frequency, the formation sensor 200 and/or the mud sensor 202 may be adapted to the full range of oil-based-mud micro-resistivity imaging tools such as OBMI, as shown in U.S. Pat. No. 6,191,588, which is herein incorporated by reference in its entirety. Thus, the downhole tool 104 (as shown in FIG. 2A) may measure the downhole fluid 108 at the same, or similar, frequency or frequencies as the subterranean formation 136.

The source electrodes 300, the return electrodes 302, and the mud return electrode 306 may be any conventional electrode capable of generating the plurality of currents 304A and/or 304B across the oil-based drilling mud, or downhole fluid 108. A power source (e.g., included in the electronics package 124 of FIG. 1) may be operatively connected to the source and return electrodes 300/302 for applying a voltage (V+, V−) thereacross. As voltage is applied, a plurality of currents 304A/304B that may flow out of one of the electrodes 300/302, for example the source electrodes 300 that can be measured by the return electrodes 302 and/or the mud return electrode 306. The source electrodes 300 and the sensor electrodes may be geometrically and materially optimized to match substantially to a fixed characteristic impedance transmission line.

The current from the electrodes may be used to determine various parameters. In an example involving a fluid passing between a pair of electrodes, an AC voltage V is applied between two electrodes to generate a resultant current I that can be measured at the sensor electrode, for example the return electrode 302 or the mud return electrode 306. The complex impedance Z may be determined from the measured current I based on the following:

$$z=|z|\exp(i\phi_z) \qquad \text{Equation (1)}$$

where its magnitude |z| based on Ohms law and phase $\phi_z$ are defined as follows:

$$|z|=|V/I| \qquad \text{Equation (2)}$$

$$\phi_z=\text{phase of I relative V} \qquad \text{Equation (3)}$$

and where exp ($i\phi_z$) based on Euler's formula is defined as follows:

$$\exp(i\phi_z)=\cos \phi_z+i \sin \phi_z \qquad \text{Equation (4)}$$

The magnitude and phase of the impedivity (sometimes referred to as the complex impedivity, of a fluid $\zeta$ is defined as follows:

$$\zeta=|\zeta|\exp(i\phi_\zeta) \qquad \text{Equation (5)}$$

Equation (5) may be derived from z when the fluid is measured by the mud sensor 202 by the relations as follows:

$$|\zeta|=k|z| \qquad \text{Equation (6)}$$

Equation (6) may also be written as follows:

$$|\zeta|=k|V|/|I| \qquad \text{Equation (7)}$$

The phase (or dielectric angle) of the fluid $\zeta$ is derived as follows:

$$\phi_\zeta=\phi_z \qquad \text{Equation (8)}$$

where:
|$\zeta$| is the magnitude of impedivity,
$\phi_\zeta$ is the phase angle of the impedivity, and
k is a constant for the device.

The constant k may be measured empirically, for example, by measuring the impedance V/I between electrodes as a fluid of known impedivity. The constant k may also be calculated from the geometry of the electrodes using conventional methods.

Data concerning the measured current may be used to determine fluid parameters, such as impedivity, resistivity, impedance, conductivity, complex conductivity, complex permittivity, tangent delta, and combinations thereof, as well as other parameters of the downhole fluid 108. The data may be analyzed to determine characteristics, or properties, of the wellbore fluid 108, such as the type of fluid (e.g., hydrocarbon, mud, contaminants, etc.) The formation imaging unit 118 may be used to analyze the data, as will be discussed in more detail below. Such analysis may be performed with other inputs, such as historical or measured data about this or other wellsites. Reports and/or other outputs may be generated from the data. The data may be used to make decisions and/or adjust operations at the wellsite. In some cases, the data may be fed back to the wellsite 100 for real-time decision making and/or operation.

Figure 5:
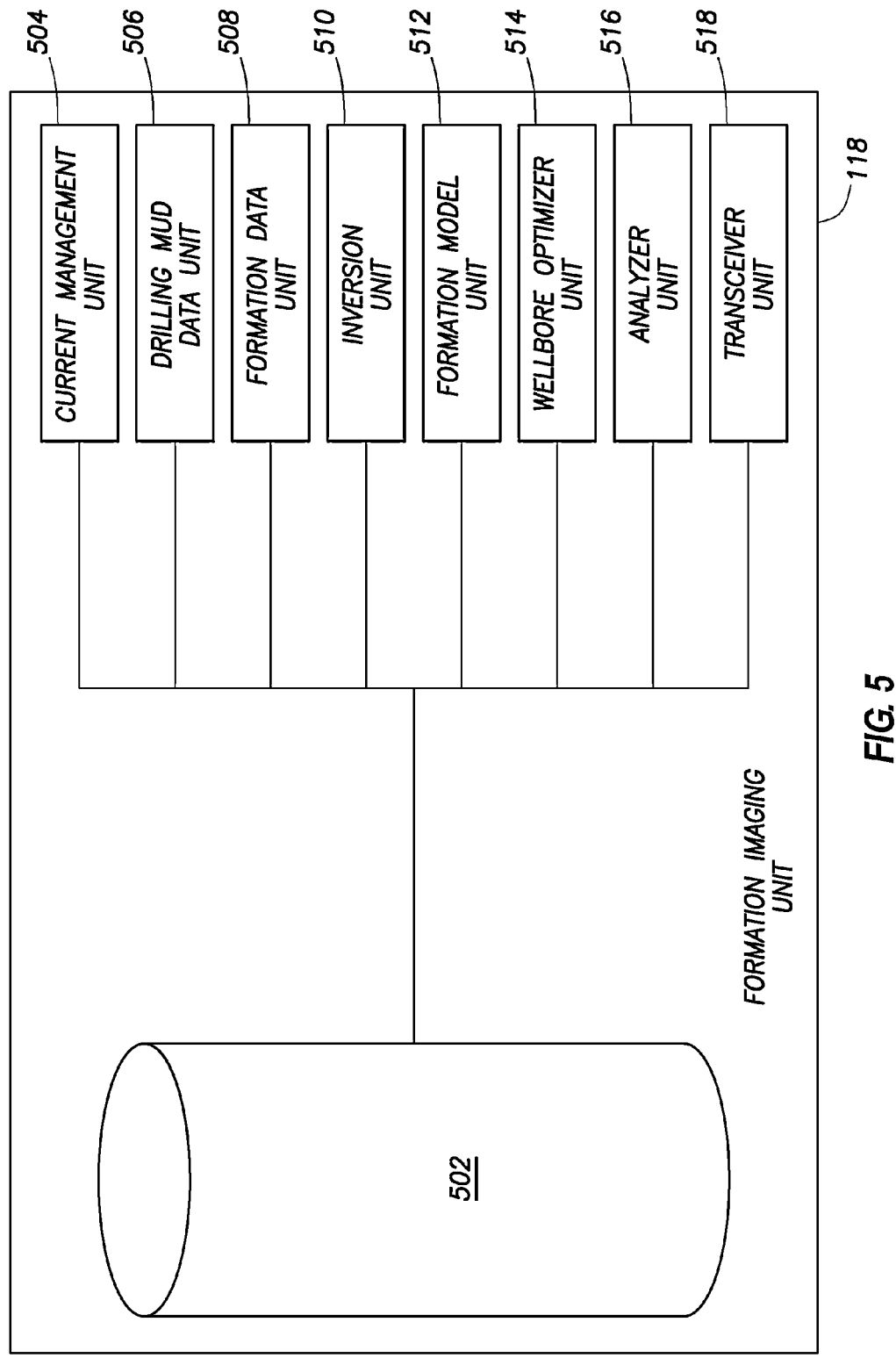
FIG. 5 depicts a schematic diagram illustrating a formation imaging unit, wherein the formation imaging unit is for imaging properties of at least one subterranean formations at the wellsite.

FIG. 5 depicts a block diagram illustrating the formation imaging unit 118 of FIG. 1. The formation imaging unit 118 may be incorporated into or about the wellsite 100 (on or off site) for operation with the controller 112. The formation imaging unit 118 may determine, generate, and/or model various formation properties. For example, the formation imaging unit 118 may use an inversion for borehole imaging with a multi-frequency approach. The formation imaging unit 118 may invert for the formation resistivity, the formation permittivity, and optionally the mud standoff to determine formation properties. The formation properties may be used to produce a formation model.

The formation imaging unit 118 may take the form of an entirely hardware embodiment, an entirely software embodiment (including firmware, resident software, micro-code, etc.), or an embodiment combining software and hardware aspects. Embodiments may take the form of a computer program embodied in any medium having computer usable program code embodied in the medium. The embodiments may be provided as a computer program product, or software, that may include a machine-readable medium having stored thereon instructions, which may be used to program a computer system (or other electronic device(s)) to perform a process. A machine readable medium includes any mechanism for storing or transmitting information in a form (such as, software, processing application) readable by a machine (such as a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Embodiments may further be embodied in an electrical, optical, acoustical or other form of propagated signal (e.g., carrier waves, infrared signals, digital signals, etc.), or wireline, wireless, or other communications medium. Further, it should be appreciated that the embodiments may take the form of hand calculations, and/or operator comparisons. To this end, the operator and/or engineer(s) may receive, manipulate, catalog and store the data from the downhole tool 104 in order to perform tasks depicted in the formation imaging unit 118.

The formation imaging unit 118 may include a storage device 502, a current management unit 504, a drilling mud data unit 506, a formation data unit 508, an inversion unit 510, a formation model unit 512, a wellbore optimizer unit 514, an analyzer unit 516, and a transceiver unit 518. The storage device 502 may be any conventional database or other storage device capable of storing data associated with the wellsite 100, shown in FIG. 1. Such data may include, for example current frequencies, current time and/or location sent, downhole fluid parameters, formation parameters, downhole fluid properties, formation properties, historical data, formation models, and the like. The analyzer unit 516 may be any conventional device, or system, for performing calculations, derivations, predictions, analysis, and interpolation, such as those described herein. The transceiver unit 518 may be any conventional communication device capable of passing signals (e.g., power, communication) to and from the formation imaging unit 118. The current management unit 504, a drilling mud data unit 506, a formation data unit 508, an inversion unit 510, a formation model unit 512, and a wellbore optimizer unit 514 may be used to receive, collect and catalog data and/or to generate outputs as will be described further below. Portions or the entire formation imaging unit 118 may be located about the wellsite 100 (as shown in FIG. 1).

The current management unit 504 may be configured to generate and collect the appropriate number and frequency of the plurality of currents 304A and/or 304B, depending on the wellbore 106 conditions and/or the type of sensor pad 120 used. The number of frequencies used may depend on the number of formation parameters and/or downhole fluid parameters to be calculated using the inversion unit 510. The number of currents and frequencies used may be dependent on the downhole fluid 108 (as shown in FIG. 1) being measured in-situ, or alternatively calculated using an inversion. If the sensor pad 120, downhole tool 104 and/or a separate downhole tool (not shown) have the mud sensor 202 (as shown in FIGS. 2-4) then the number of the plurality of currents 304A sent into the formation may be minimized at two logging frequencies. If the mud sensor 202 is not present, the mud properties will be inverted for and will require the current management unit 504 to generate the plurality of currents 304A at a minimum of three logging frequencies. The number of logging frequencies used may increase to improve accuracy and/or as the number of unknowns in the downhole fluid and/or the formation increase, as will be described in more detail below.

The current management unit 504 may send the determined number of multiple logging frequencies into the formation at substantially the same time at multiple locations along the formation. The plurality of currents 304B for measuring the downhole fluid properties may have the same logging frequencies, or a portion of the logging frequencies, as those sent into the subterranean formation 136 (as shown in FIG. 1). The current management unit 504 may collect, catalog, store and/or manipulate current data regarding the logging frequencies sent and collected by the formation sensor 200 and/or the mud sensor 202 (as shown in FIG. 2). A historical record of the current data may be kept for each logging location in the wellbore 106 (as shown in FIG. 1).

The drilling mud data unit 506 may be used to collect, catalog, store, manipulate and/or supply mud data. The mud data may be the measured data from the mud sensor 202 (as shown in FIG. 2). Further, the mud data may be obtained from the measured data from the formation sensor 200, when there is no separate mud sensor 202. If there is no separate mud sensor 202, the mud data may be inverted along with formation data to determine the downhole fluid properties, as will be discussed in more detail below. The measured mud data may be measured mud parameters, or mud electric parameters, that may be manipulated by the inversion unit 510 to determine mud and/or formation properties. The mud data, or mud parameters, may be mud impedance, permittivity, resistivity, and mud standoff. This mud data that is measured may be manipulated to determine mud properties such as mud permittivity, current amplitude, current phase, resistivity and conductivity. The downhole fluid properties typically do not change significantly in the wellbore 106. Therefore, it may only be necessary to measure or invert for the mud parameters periodically at a much lower sampling rate than obtaining the formation parameters. The downhole fluid parameters, or properties, may be determined by the one or more sensors independent of a determination of the formation parameters. Thus, the determined fluid parameters may be used to more accurately determine the formation parameters as will be described in more detail below.

The formation data unit 508 may be used to collect, catalog, store, manipulate and/or supply formation data. The formation data may be the measured data from the formation sensor 200 (as shown in FIG. 2). Because the plurality of currents 304A (as shown in FIGS. 3 and 4) may have data regarding the mud and the formation, the formation data may have to be manipulated in order to determine the formation parameters and/or formation properties. The formation data, or formation parameters, may be the measured parameters from the formation 136 such as formation impedance, amplitude and phase of the current, and the like. The formation data, or formation parameters, may be manipulated along with the mud data to determine formation properties such as resistivity, conductivity, permittivity, and the like. The formation data may be obtained from the plurality of currents 304A (as shown in FIGS. 3 and 4) at the plurality of frequencies. The formation data may have current data from a plurality of locations along the wellbore 106.

The inversion unit 510 may obtain the formation data and mud data from the drilling mud data unit 506 and/or the formation data unit 508. To determine formation resistivity, or an inverted formation resistivity, the inversion unit 510 may invert, or parametrically invert, the multiple current measurements made at several frequencies, as will be described in more detail below. The number of frequencies used may depend on the number of parameters to be inverted. The inversion unit 510 may invert the mud data and/or the formation data in order to determine formation properties and/or downhole fluid properties. The inverted formation data, and optionally, the mud data, obtained at the plurality of frequencies may be used to obtain formation properties for borehole imaging. The parameters to be inverted may be the formation resistivity, the formation permittivity, and/or the mud standoff (if the mud data is collected independently of the formation data). If the mud parameters are not measured, for example, by the mud sensor 202 (as shown in FIG. 2), the downhole fluid properties may be inverted for by adding extra frequencies to the plurality of current 304A used by the formation sensor 200. The inversion unit 510 may further invert signal biases caused by systematic measurement drifts in the in-phase and out-of-phase signals or in the phase and amplitude signals.

The plurality of currents 304A (as shown in FIGS. 3 and 4) may first pass through the mud cake 132, or mud-standoff, then the formation. The impedance from the mud cake 132 and the formation combined may be measured. The measured impedance may be given approximately as:

$$Z = V/I$$
$$= K_{mud} \Delta \frac{R_{mud}}{1 + j\omega\varepsilon_0 \varepsilon_{mud} R_{mud}} + K_{rock} \frac{R_{rock}}{1 + j\omega\varepsilon_0 \varepsilon_{rock} R_{rock}}$$
(Equation 9)

Where $\Delta$ is the mud standoff, $K_{mud}$ and $K_{rock}$ are tool related coefficients, and $\omega$ is the operating frequency, or logging frequency for each of the plurality of currents 304A. $\varepsilon_{mud}$ and $\varepsilon_{rock}$ may be the relative permittivity of the mud and the formation respectively. $R_{mud}$ and $R_{rock}$ may be the resistivity of the mud and the formation respectively. The term $\varepsilon_0$ represents the permittivity of free space (a constant=$8.85419 \times 10^{-12}$) and $j$ represents $\sqrt{-1}$. The terms subscripted by "mud" represent the contribution to Z from the mud or mudcake occupying the space between the padface and the formation, depending of the electrical properties of the formation, the properties $\varepsilon_{rock}$ and $R_{rock}$ the contribution from the mud or mud cake 132 may be significantly larger than the contribution from the formation.

In equation 9, the formation sensor 200 (as shown in FIGS. 2-4) current I may have independent components that are respectively in-phase and out-of-phase with the voltage V. These may be its real and imaginary parts real(I) and imag(I). Therefore, equation 9 may represent two independent equations:

$$real(V/I) = \Delta K_{mud} R_{mud} / [1 + (\omega\varepsilon_0 \varepsilon_{mud} R_{mud})^2] + K_{rock} R_{rock} / [1 + (\omega\varepsilon_0 \varepsilon_{rock} R_{rock})^2]$$
(Equation 10)

and $$imag(V/I) = -\omega\varepsilon_0 \{\Delta K_{mud} \varepsilon_{mud} R_{mud}^2 / [1 + (\omega\varepsilon_0 \varepsilon_{mud} R_{mud})^2] + K_{rock} \varepsilon_{rock} R_{rock}^2 / [1 + (\omega\varepsilon_0 \varepsilon_{rock} R_{rock})^2]\}$$
(Equation 11)

There may be five unknowns in these two equations $R_{rock}$, $\varepsilon_{rock}$, $R_{mud}$, $\varepsilon_{mud}$, and $\Delta$. $R_{rock}$ may be the property of interest that is used to create a formation model. Therefore, if three of these unknowns may be accounted for then $R_{rock}$ may be calculated.

The measured impedance Z, the formation resistivity $R_{rock}$ and the mud standoff $\Delta$ may be frequency independent parameters. Therefore, these frequency independent parameters may correspond to two unknown parameters that are fixed at a particular logging point irrespective of the number of frequencies used. The formation permittivity $\varepsilon_{rock}$ may also be an unknown parameter. The unknown formation permittivity $\varepsilon_{rock}$ may be included in the inversion. The formation permittivity $\varepsilon_{rock}$ may be frequency dependent. Thus, the number of formation permittivities $\varepsilon_{rock}$ to be inverted may be equal to the number of operating frequencies, or logging frequencies used. Alternatively, the inversion unit 510 may model the formation permittivity $\varepsilon_{rock}$ as a polynomial function of frequency or in terms of any other functional form. Ideally we would like to have a minimum number of coefficients to describe this frequency dependence. We can then invert for these coefficients instead of the formation permittivity $\varepsilon_{rock}$. One example of an inversion may be given as follows:

$$\varepsilon_{rock} = a_1 + a_2 \omega^{n_1} R_{rock}^{n_2}$$
(Equation 12)

where $a_1$, $a_2$, $n_1$, $n_2$ may be unknown coefficients which may be found by performing an inversion with the inversion unit 510. The number of coefficients may be fixed and therefore does not change with the number of logging frequencies used. Therefore, the number of unknowns due to the formation permittivity $\varepsilon_{rock}$ may not increase with the number of frequencies if the coefficients are determined by inversion. Alternatively, we may also consider that $R_{rock}$ is frequency dependent and $\varepsilon_{rock}$ is frequency dependent, or that both are frequency dependent. The coefficients introduced to represent the frequency dependence can be inverted for by increasing the number of logging frequencies to make available a sufficiently large number of equations.

The downhole fluid properties, or mud properties, such as permittivity and conductivity, may also be frequency dependent, or function of the frequencies. The mud properties may be directly inverted for at each logging frequency. Alternatively, the mud properties may be expressed as a polynomial function of frequency or in any other functional form with a minimum number of coefficients. These coefficients may be determined by inversion using the inversion unit 510.

To determine the unknown parameters, or formation and/or downhole fluid properties $R_{rock}$, $\varepsilon_{rock}$, $R_{mud}$, $\varepsilon_{mud}$, and $\Delta$, the inversion unit 510 may perform an inversion of the formation data and/or the mud data. The inversion may be an iterative process where guesses for the unknown properties $R_{rock}$, $\varepsilon_{rock}$, $R_{mud}$, $\varepsilon_{mud}$, and $\Delta$ are successively refined to reduce to a minimum the difference between the measured current values and corresponding values computed from a forward model, using as input the guessed values of the unknown parameters.

In one example, equation 9 is the forward model. The functions $K_{mud}$ and $K_{rock}$ may be specific to a particular downhole tool 104 (as shown in FIG. 1). To make inversion feasible, a forward model such as equation 9 may be constructed that represents closely the behavior of the actual downhole tool. Any suitable method of representing the behavior of the downhole tool 104 may be used. For example, a finite element (FE) modeling may be used to compute the formation sensor current, and/or the mud sensor current, for a particular downhole tool 104. The FE model may take into account the geometry and frequency of the downhole tool, and the materials used in its construction. It may also take into account the position of the downhole tool relative to the wellbore wall 130 and/or the mud cake 132, the size of the wellbore 106 and the materials inside and surrounding it. A large number of such FE simulations may be made to populate a representative volume of ($R_{rock}$, $\epsilon_{rock}$, $R_{mud}$, $\epsilon_{mud}$, and $\Delta$) space, for the logging frequencies concerned. These numerical data may then be represented in an analytic form, such as equation 9 with the analytic functions $K_{mud}$ and $K_{rock}$. Using this inversion process, the formation resistivity $R_{rock}$, or inverted formation resistivity, may be determined.

The downhole tool 104 electronics may be difficult to calibrate at a high operating frequency. Therefore impedance measurements might have a systematic drift in the in-phase or out-of-phase components. The systematic drifts may be part of the unknowns to be inverted by the inversion unit 510.

If the mud parameters are not directly measured, for example by the mud sensor 202 (as shown in FIGS. 2-4), the downhole fluid properties may be inverted for with the formation properties and/or the mud standoff. In order to invert for the downhole fluid properties the number of frequencies used in the plurality of currents 304A may be increased. The increase in frequencies may allow the inversion unit to determine the additional unknowns created by the downhole fluid parameters being unknown. The downhole fluid 108 (as shown in FIG. 1) remains fairly constant in the wellbore. Therefore, the inversion unit 510 may only need to invert for the downhole fluid properties sporadically. Therefore, the increased number of frequencies and therefore, the number of the plurality of currents 304A may only need to be increased sporadically while logging. Further, the number of currents 304A used may be increased to allow the inversion unit to determine the mud properties during the entire logging operation.

The formation model unit 512 may construct a formation model from the formation properties obtained by the inversion unit 510. The formation model may be any suitable model for determining formation properties and/or the location of valuable downhole fluids such as hydrocarbons. The formation model may be constructed based on the formation resistivity $R_{rock}$. The formation model unit 512 may store, manipulate, and organize one or more formation models. The formation model may be an approximate model, or may be replaced by a tool model derived using 3D modeling. The 3D model may be constructed using the data from the inversion unit 510, for example the multi-frequency parametric inversion, to obtain the formation resistivity from the measured impedance.

The formation model may be constructed with one or more layer boundaries using inverted formation properties from measurements taken at multiple logging points in the wellbore 106 (as shown in FIG. 1). Thus, the formation model may be a homogeneous formation model at each logging point in order to limit the number of model parameters. The homogeneous approach may lead to uncertainty at or near the formation boundaries where the medium is not homogeneous. Therefore, a multi-layer formation model may be constructed by the formation model unit 512 to represent the formation. For the multi-layered formation model more parameters may be inverted by the inversion unit 510. For example, each formation layer may have its resistivity, permittivity, boundary positions, layer dip, and/or layer azimuth inverted. The increased number of parameters to be inverted by the inversion unit 510 may require using measurements of multiple log points in the inversion.

The wellbore optimizer unit 514 may use the formation model and/or any of the data stored in the formation imaging unit 118 to construct, optimize, change and/or create a well plan. The well plan may allow an operator, controller and/or driller to optimize the production of hydrocarbons from the wellsite. For example, the well plan may determine drilling trajectories, location of multiple wellbores, drilling methods, completion methods, production methods, and the like. The wellbore optimizer unit 514 may be an optional unit. Further, the wellbore optimizer unit 514 may be located offsite.

Figure 6:
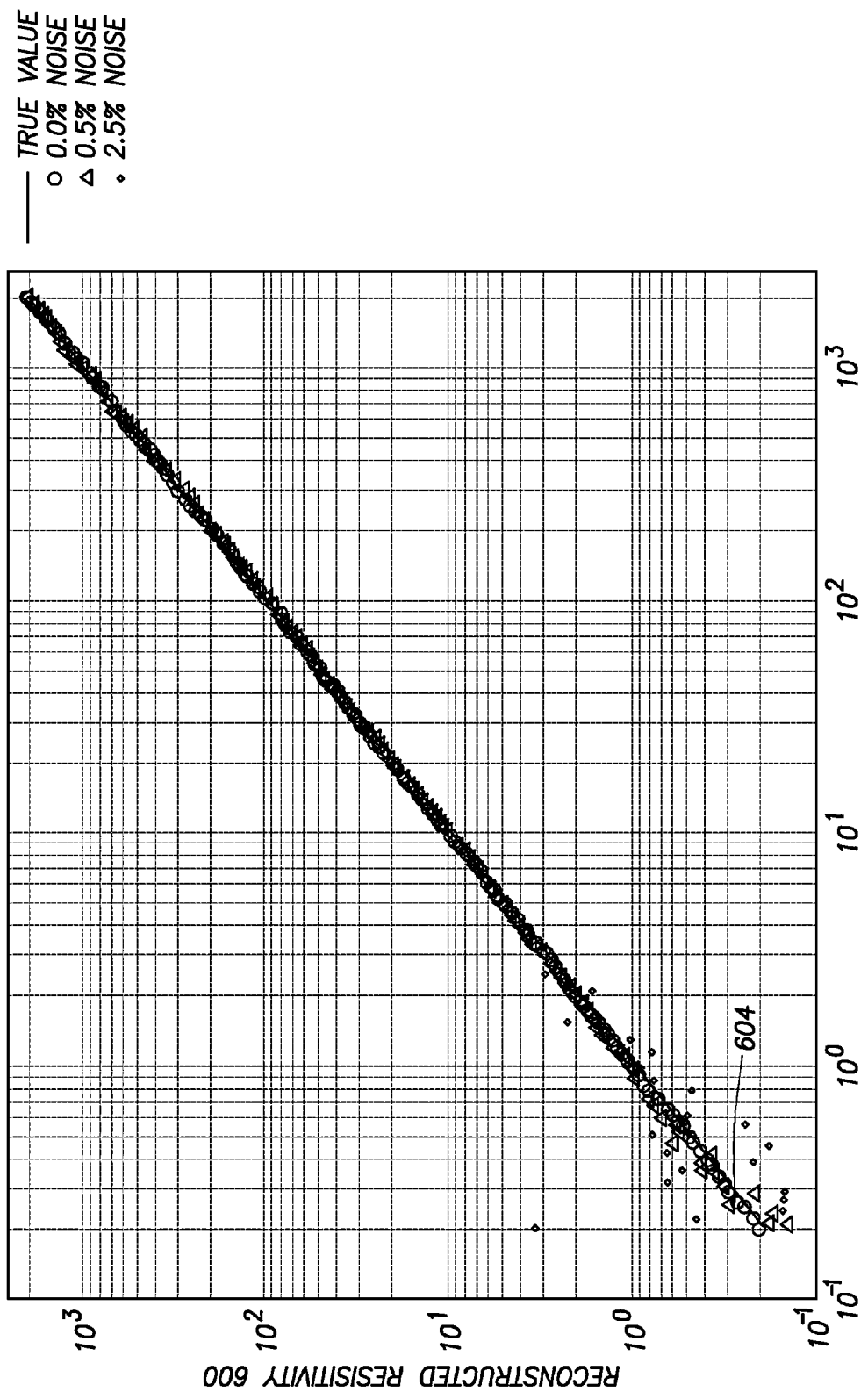
FIGS. 6-11 are graphical depictions of various outputs created by the formation imaging unit of FIG. 5.
Figure 7:
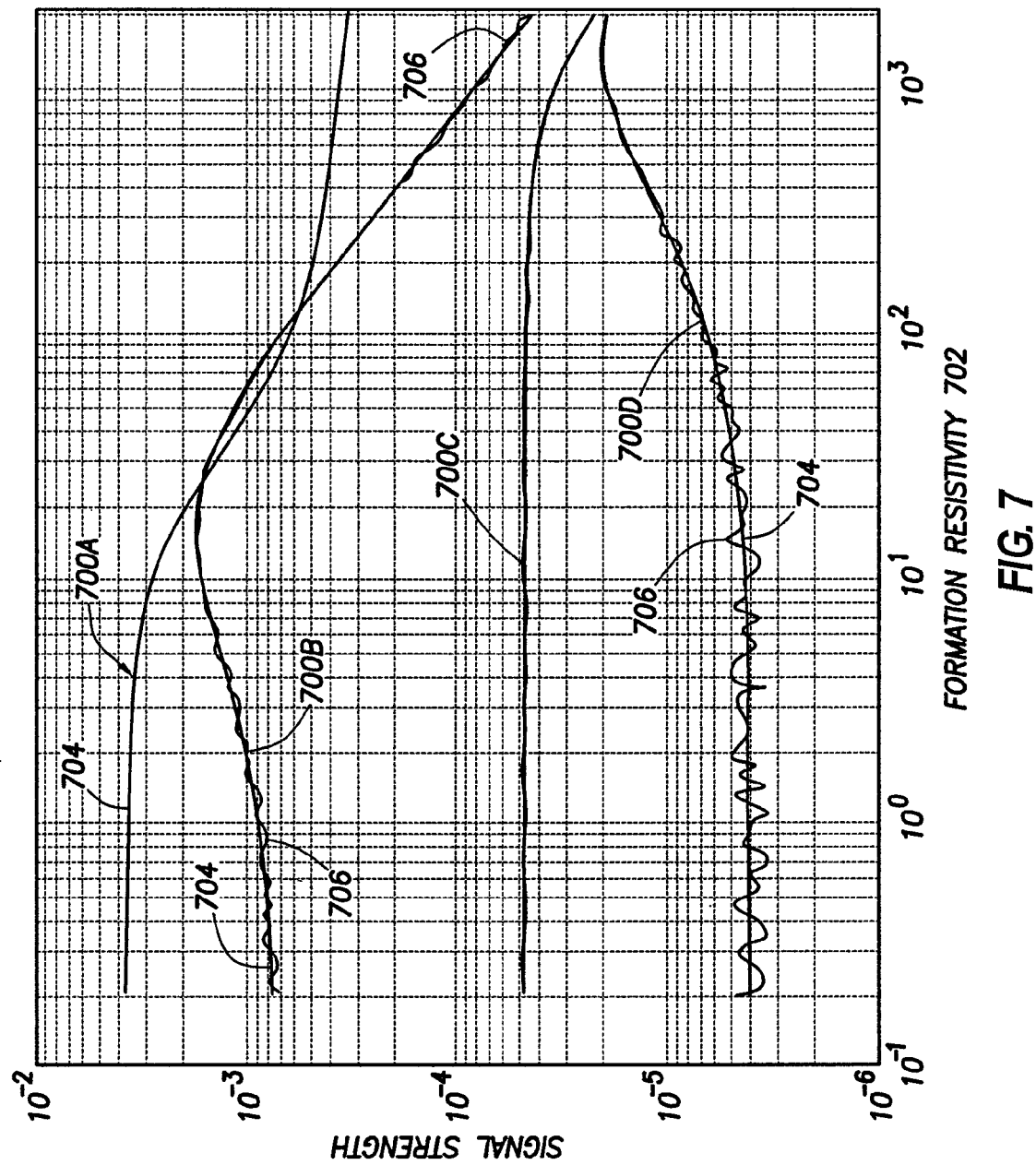

FIGS. 6-11 are graphical depictions of various outputs that may be generated by the formation imaging unit of FIG. 5. FIGS. 6 and 8-11 are plots of true resistivity (x-axis) versus reconstructed (inverted) resistivity (y-axis). FIG. 7 is a plot of formation resistivity (x-axis) versus signal strength (y-axis).

FIG. 6 depicts a comparison between the inverted formation resistivity 600, as determined by the inversion unit 510, and a true formation resistivity 602. A line 604 represents the case when the inverted formation resistivities agree, almost exactly, with their true values. In this example, two logging frequencies were used and it is assumed that the mud properties are known through a direct measurement by the mud sensor 202 (as shown in FIG. 2). In this case, there are a total of four unknowns that include the formation resistivity $R_{rock}$, two formation permittivities $\epsilon_{rock}$ (one for each frequency), and the mud standoff A. Each frequency produces two measured data points, i.e., the in-phase and out-of-phase signals, thus resulting in four equations employed by the inversion unit 510.

In the example as shown in FIG. 6, the inversion was carried out on synthetic data to which random noise was added. Assuming the measured complex impedance is Z, we add noise in the following fashion, In phase signal=$Re\{Z\}$+$\|Z\|$*ran*$\delta$ %  (Equation 13)

Out of phase signal=$Im\{Z\}$+$\|Z\|$*ran*$\delta$ %  (Equation 14)

where $\|Z\|=\sqrt{[(Re\{Z\})^2+(Im\{Z\})^2]/2}$ and ran is a random number. $-1<$ran$<1$. As shown in FIG. 6, the formation resistivities $R_{rock}$ may be determined using the inversion unit 510 reliably with two frequencies (for example 0.5 and 40 MHz) provided the mud properties are known and the measurements are noise-free. However, there is typically noise contaminating the measured data. The inversion of the formation resistivity may become less reliable as the noise level increases. This may be true for less resistive formations due to the impedance contribution from the formation being more or less directly proportional to the formation resistivity $R_{rock}$.

FIG. 7 shows an output of the inversion unit 510 for synthetic data (of the measured impedance 700A-700D) as a function of the formation resistivity 702, shown on the horizontal axis. A smooth line 704 for each of the measured impedances 700A-700D, represent the noise-free data while non-smooth curves 706 represent the same data after adding 2.5% random noise. The measured impedance 700A may represent an imaginary impedance at 40.0 MHz. The measured impedance 700B may represent a real impedance at 40.0 MHz. The measured impedance 700C may represent an imaginary impedance at 0.5 MHz. The measured impedance 700D may represent a real impedance at 0.5 MHz. The real part of the measured impedances 700A-700D shows a distortion due to contamination by the noise, especially for conductive formations. To correct this problem the measurements may be performed at a higher frequency. As is shown in the 40 MHz curves measured impedance 700A and 700B, in comparison with the 0.5 MHz curves, 700C and 700D, a higher frequency of operation may reduce the amplitude difference between the in-phase and out-of-phase signals, especially for the conductive formations. The higher frequency may reduce the effect of the added random noise, thus helping to improve the inversion performed by the inversion unit 510.

The inversion unit 510 (as shown in FIG. 5) may have to invert for three mud coefficients when the downhole fluid parameters are not measured. The inversion unit 510 may further need to invert for the formation resistivity and the mud standoff in addition to the mud coefficients. The additional frequencies used with the plurality of currents 304A may allow the inversion unit 510 to determine the mud parameters. Although each added operating frequency may provide two additional equations, it may also introduce one unknown formation permittivity to be inverted. Table 1 (shown below) depicts the number of unknowns and the number of equations that may be used as the number of operating frequencies changes.

TABLE 1

| Number of Frequencies | Number of Unknowns | Number of Equations |
| --- | --- | --- |
| 2 | 7 | 4 |
| 3 | 8 | 6 |
| 4 | 9 | 8 |
| 5 | 10 | 10 |

Figure 8:
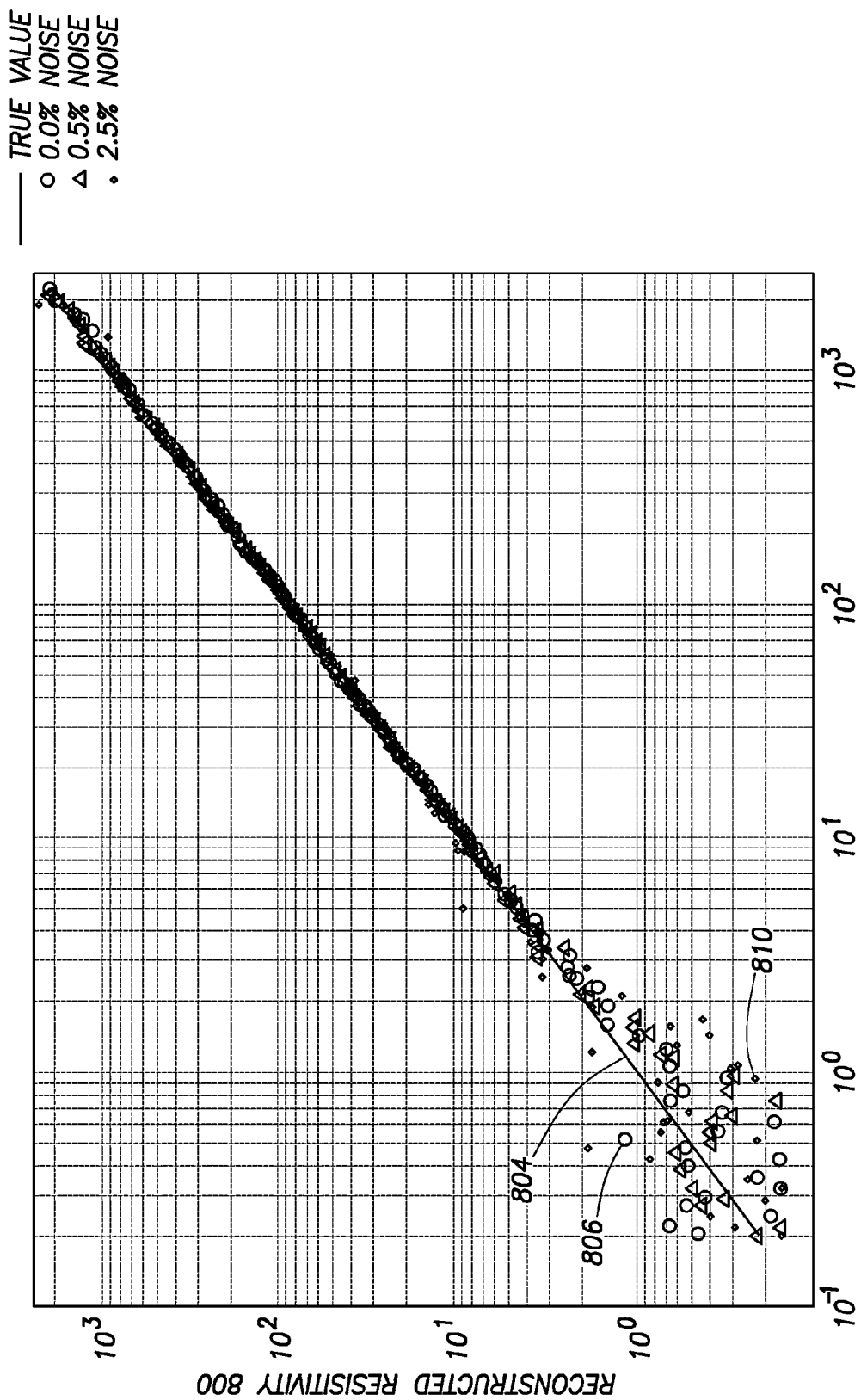
Figure 9:
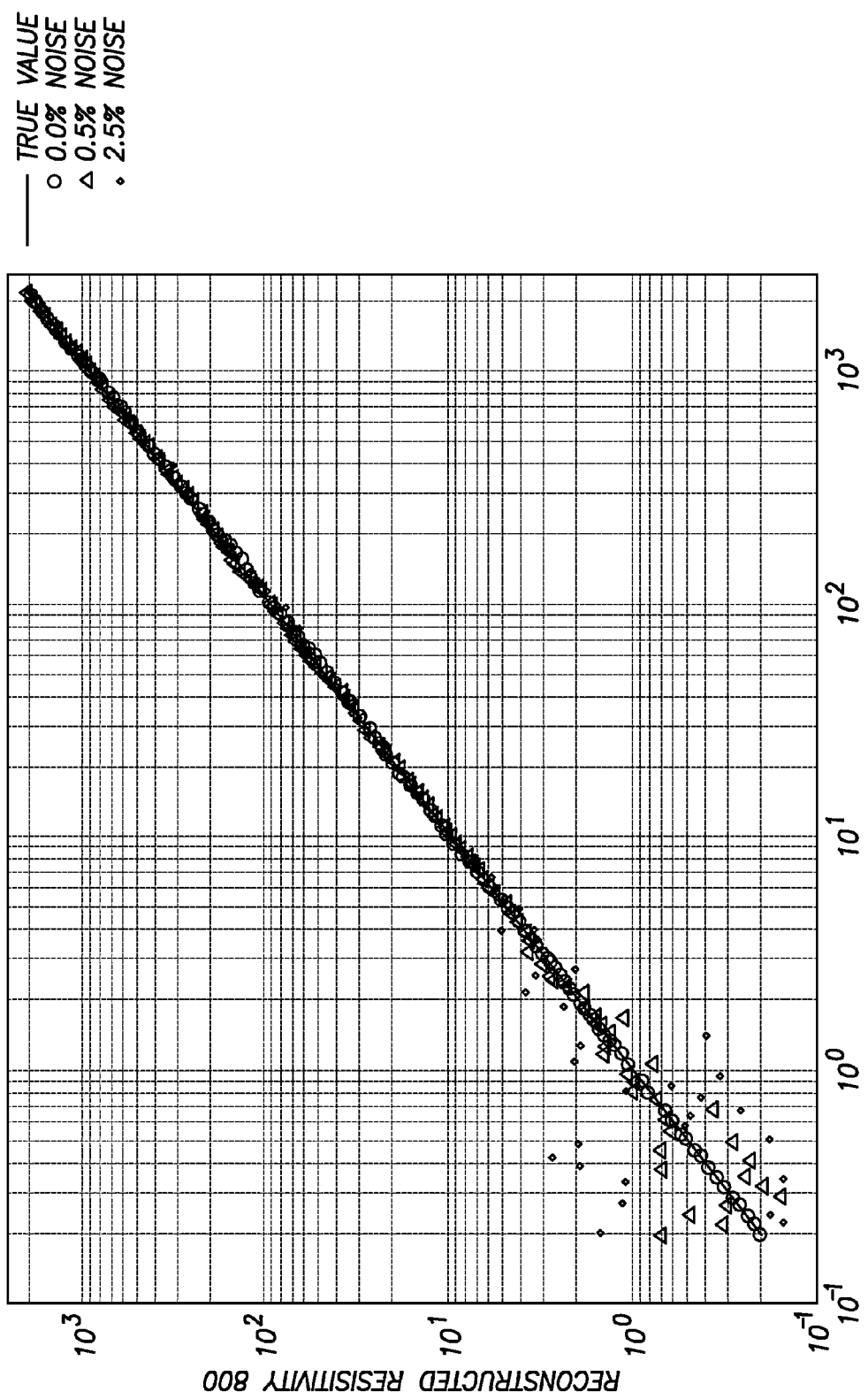
Figure 10:
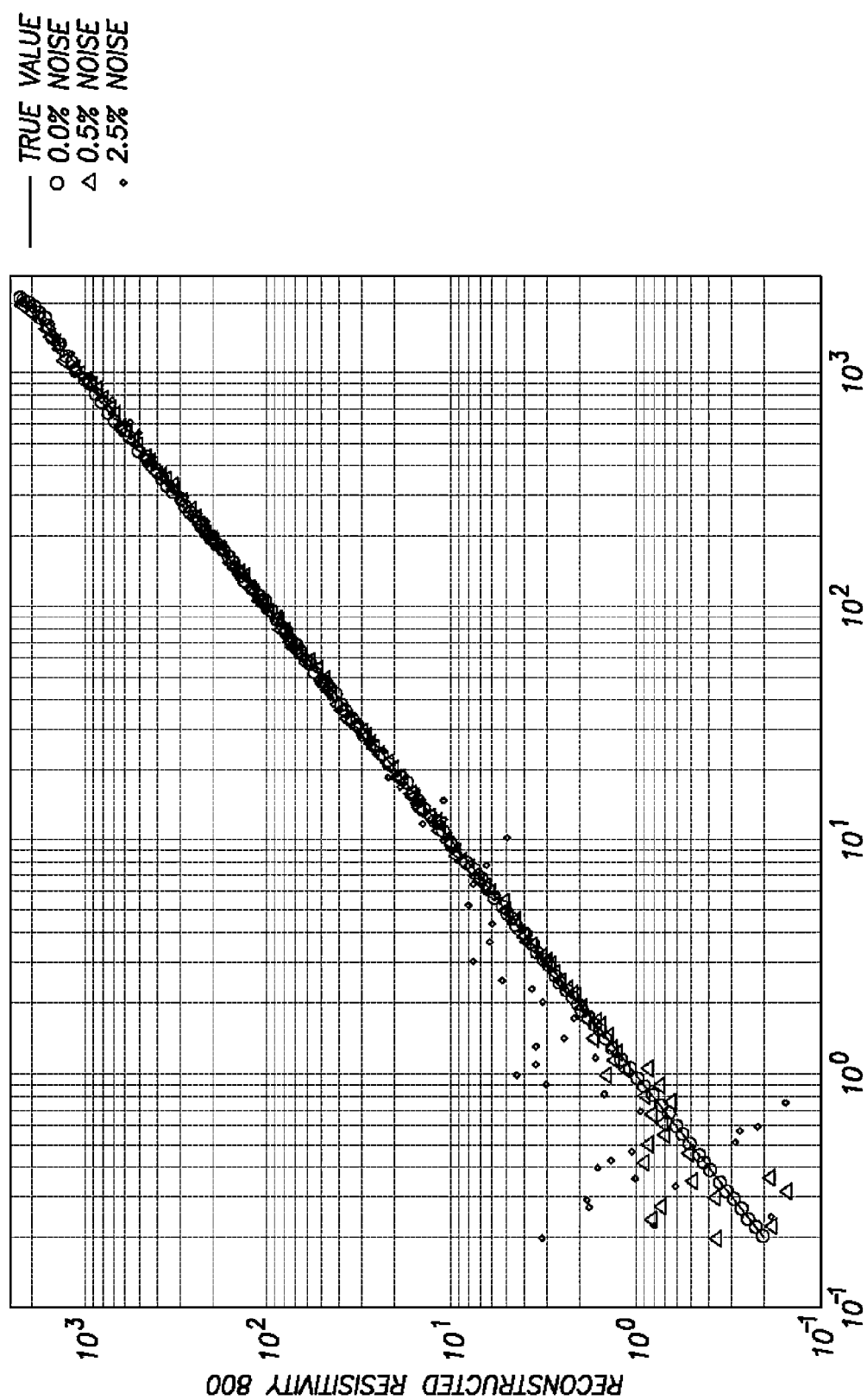
Figure 11:
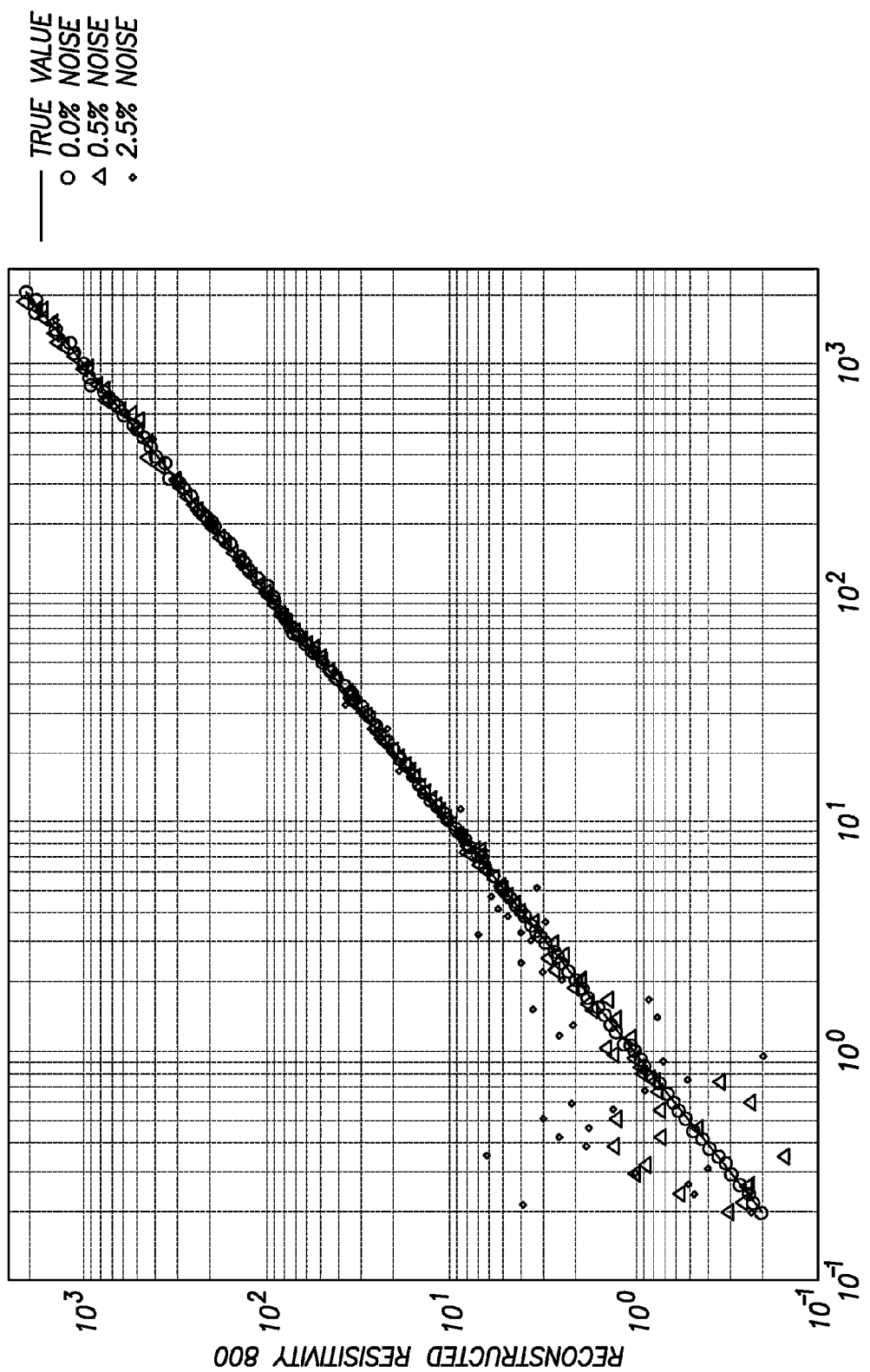

FIGS. 8-11 depict an example of inverted results, performed by the inversion unit 510 (as shown in FIG. 5), for each of the tabulated cases as shown in Table 1. The frequency range as shown, is between 0.5 and 40 MHz, and the operating frequencies are selected uniformly on a logarithmic scale within this range. Although the frequency range is shown between 0.5 and 40 MHz any suitable frequency may be used. As shown in FIGS. 8-11, the inverted resistivity 800 produced by the inversion unit 510 is shown on the vertical axis. A true resistivity 802 is shown on the horizontal axis. The plotted line 804 may represent the true resistivity value, the plotted circles 806 may represent the inverted resistivity with a 0.0% noise. The plotted triangles may represent the inverted resistivity with a 0.5% noise. The plotted dots 810 may represent the inverted resistivity with a 2.5% noise. FIG. 8 may represent an inversion using two frequencies and seven unknowns. FIG. 9 may represent an inversion using three frequencies and eight unknowns. FIG. 10 may represent an inversion using four frequencies and nine unknowns. FIG. 11 may represent an inversion using five frequencies and ten unknowns. As shown, the inverted resistivity produced by the inversion unit 510 may be substantially accurate when the formation 136 is more resistive than about 5 ohms. The results become less accurate as the formation 136 resistivity reduces and as the noise added to the data increases.

For the outputs shown in FIGS. 8-11, the inversion may be underdetermined since the number of equations used is less than the number of unknowns to be inverted. FIGS. 9 and 10 show that when no noise is added to the data, the inverted formation resistivity may be substantially accurate down to 0.2 ohms. This may be due to the measurements being most sensitive to the formation resistivity but less sensitive to the rest of the parameters such as the mud properties.

Comparing all the outputs shown in FIGS. 8-11 from the inversion unit 510 (as shown in FIG. 5), it is shown that three operating frequencies, or logging frequency, may allow for the most robust inversion results, when compared to the higher frequencies. However, increasing the operating frequency, or logging frequency, range if possible may improve the situation for conductive formations since the noise effect will be reduced as shown in FIG. 7.

Figure 12:
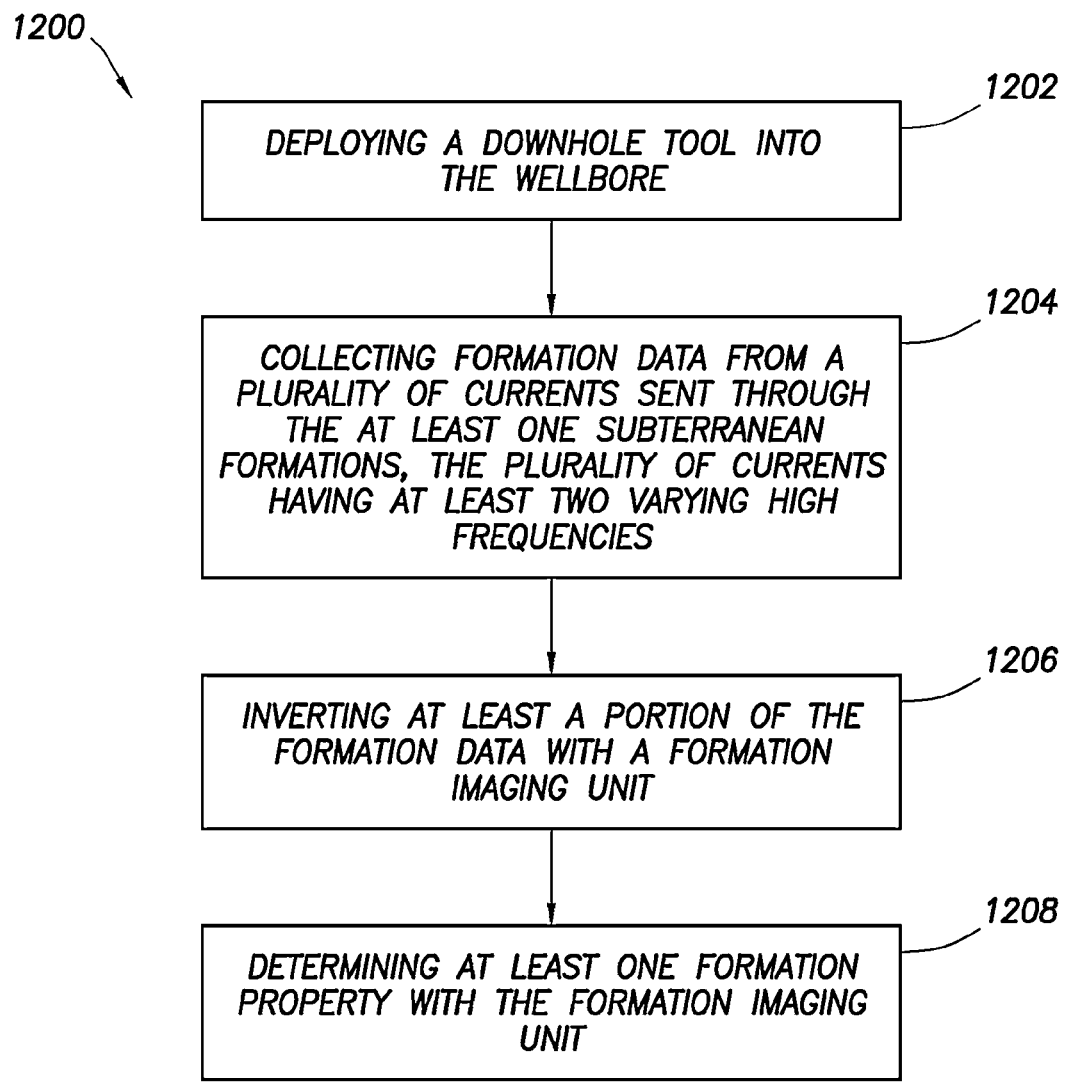
FIG. 12 is a flow chart depicting a method of imaging properties of at least one subterranean formation.

FIG. 12 depicts a flow diagram 1200 illustrating a method for imaging properties of at least one subterranean formation 136 in the wellbore 106 (as shown in FIG. 1). The flow begins by deploying 1202 a downhole tool into the wellbore. The downhole tool may be any of the downhole tools described herein and may have the sensor pad 120 thereon. The flow continues by collecting 1204 formation data from a plurality of currents sent through the at least one subterranean formation, the plurality of currents having at least two varying, or different, high frequencies. The flow continues by inverting 1206 at least a portion of the formation data with a formation imaging unit and determining 1208 at least one formation property with the formation imaging unit.

Figure 13A:
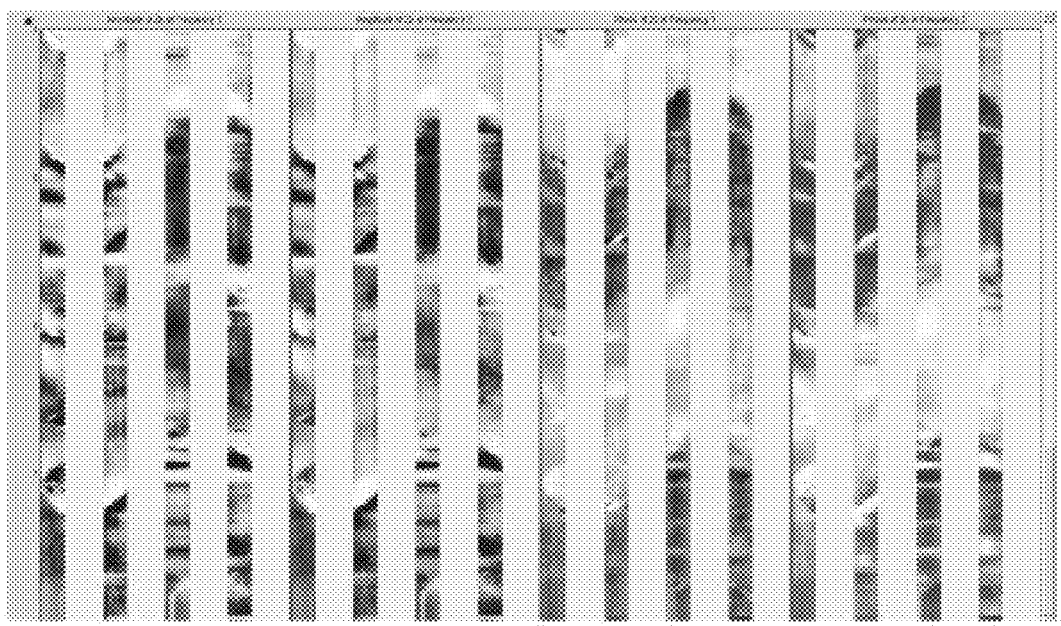
FIG. 13A is an example image of mud sensor impedance measured at two frequencies in a well filled with oil-based mud using the imaging unit or system described herein.
Figure 13B:
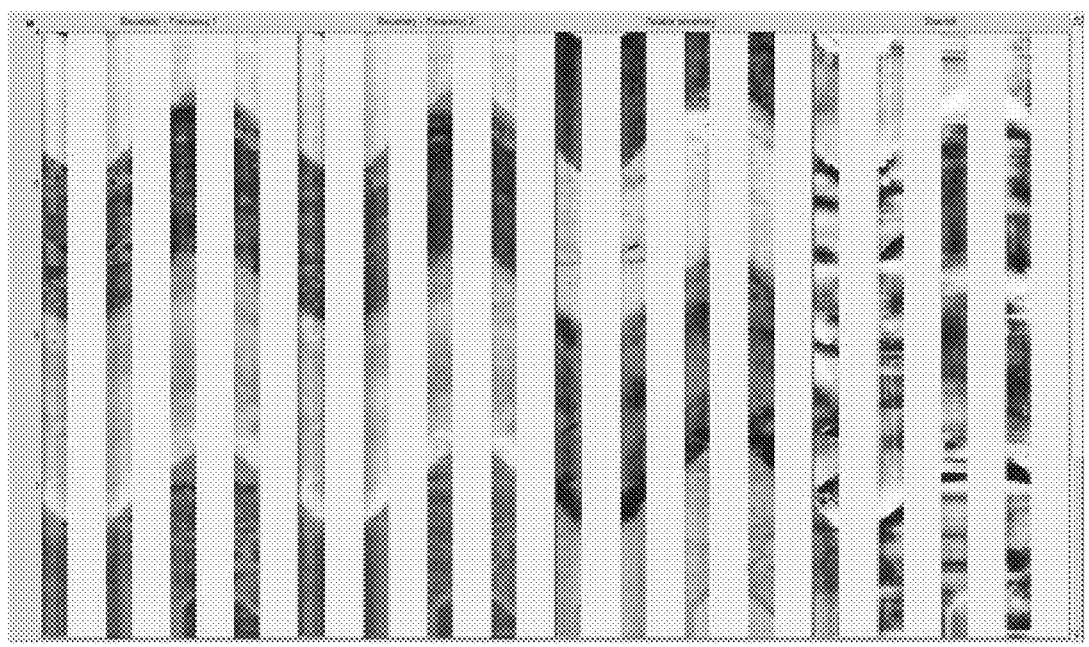
FIG. 13B is an image obtained after inversion of impedance shown in FIG. 13A.

FIG. 13A is an example image of mud sensor impedance measured at two frequencies in a well filled with oil-based mud using the imaging unit or system described herein. From left to right, the image shows amplitude of impedance measured at a first frequency, amplitude of impedance measured at a second frequency, phase of impedance measured at the first frequency and phase of impedance measured at the second frequency. FIG. 13B is an image obtained after inversion of impedance shown in FIG. 13A. The impedivity of the mud was measured separately for the inversion. From left to right, the image shows formation resistivity measured at the first frequency, formation resistivity measured at the second frequency, formation relative permittivity and standoff.

While the embodiments are described with reference to various implementations and exploitations, it will be understood that these embodiments are illustrative and that the scope of the inventive subject matter is not limited to them. Many variations, modifications, additions and improvements are possible. For example, additional sources and/or receivers may be located about the wellbore to perform seismic operations.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A formation imaging unit for imaging properties of at least one subterranean formation in a wellbore at a wellsite, the formation imaging unit comprising:
   a current management unit for collecting data from at least two currents injected into the at least one subterranean formation, the at least two currents having at least two different frequencies;
   a drilling mud data unit for determining at least one drilling mud parameter;
   a formation data unit for determining at least one formation parameter from the collected data; and
   an inversion unit configured to determine at least one of a drilling mud property and a formation property based on an inversion of the at least one drilling mud parameter or an inversion of the at least one formation parameter.

2. The formation imaging unit of claim 1, wherein the inversion unit is configured to determine at least one drilling mud property and at least one formation property based on an inversion of data from the drilling mud unit or an inversion of data from the formation data unit.

3. The formation imaging unit of claim 1, wherein the inversion unit is configured to determine at least one formation property based on an inversion of the drilling mud parameter and the at least one formation parameter.

4. The formation imaging unit of claim 3, wherein the at least two currents comprise at least three currents.

5. The formation imaging unit of claim 3, wherein the inversion unit is configured to determine a sensor standoff.

6. The formation imaging unit of claim 5, wherein a sensor standoff is determined by the inversion unit using the measured borehole fluid mud property.

7. The formation imaging unit of claim 1, wherein the drilling mud parameter is determined by measuring a borehole fluid mud property with a drilling mud sensor.

8. The formation imaging unit of claim 1, wherein the at least two currents have a frequency range between 0.5 MHz and 100 MHz.

9. The formation imaging unit of claim 1, further comprising a formation model unit for producing a formation model based on the at least one formation property.

10. A system for imaging properties of at least one subterranean formation in a wellbore at a wellsite, the system comprising:
    a formation sensor for collecting at least two currents injected into the at least one subterranean formation, the formation sensor positionable on a downhole tool deployable into the wellbore;
    a controller for controlling the formation sensor; and
    a formation imaging unit, the formation imaging unit comprising:
      a current management unit for collecting data from the at least two currents injected into the at least one subterranean formation, the at least two currents having at least two different frequencies;
      a drilling mud data unit for determining at least one drilling mud parameter;
      a formation data unit for determining at least one formation parameter from the collected data; and
      an inversion unit configured to determine at least one of a drilling mud property and a formation property based on an inversion of the at least one drilling mud parameter or an inversion of the at least one formation parameter.

11. The system of claim 10, wherein the inversion unit is configured to perform a multi-frequency parametric inversion on the at least one formation parameter.

12. The system of claim 10, comprising a modeling unit, wherein the modeling unit is configured to construct a three-dimensional model based on the multi-frequency parametric inversion.

13. A method for imaging properties of at least one subterranean formation in a wellbore at a wellsite, the method comprising:
    deploying a downhole tool into the wellbore, the downhole tool having a formation sensor thereon;
    collecting at least two currents sent through the at least one subterranean formation from the formation sensor;
    sending formation data from the at least two currents to a formation imaging unit, the formation imaging unit comprising:
      a current management unit for collecting data from the at least two currents injected into the at least one subterranean formation, the at least two currents having at least two different frequencies;
      a drilling mud data unit for determining at least one drilling mud parameter;
      a formation data unit for determining at least one formation parameter from the collected data;
      an inversion unit for determining at least one formation property by inverting the at least one formation parameter or the at least one drilling mud parameter; and
    determining at least one formation property with the formation imaging unit.

14. The method of claim 13, further comprising measuring a drilling mud parameter by collecting at least one current sent through a drilling mud.

15. The method of claim 14, wherein the current sent through the drilling mud has the same frequency as the at least one of the two different frequencies.

16. The method of claim 15, further comprising exchanging the current sent by the mud sensor substantially through the drilling mud.

17. The method of claim 16, wherein collecting the at least two currents comprises collecting the two currents and inverting the formation parameters collected by the two currents.

18. The method of claim 17, further comprising determining a formation resistivity by inverting the formation parameters.

19. The method of claim 13, wherein collecting the at least two currents comprises collecting three currents and inverting the formation parameters collected by the three currents and inverting for the drilling fluid parameters.

20. The method of claim 19, further comprising determining a formation resistivity by inverting the formation parameters, the drilling fluid parameters and a sensor standoff.

* * * * *